Dec. 28, 1954  W. C. DILG  2,698,208
SIDE BEARING
Filed Feb. 12, 1953
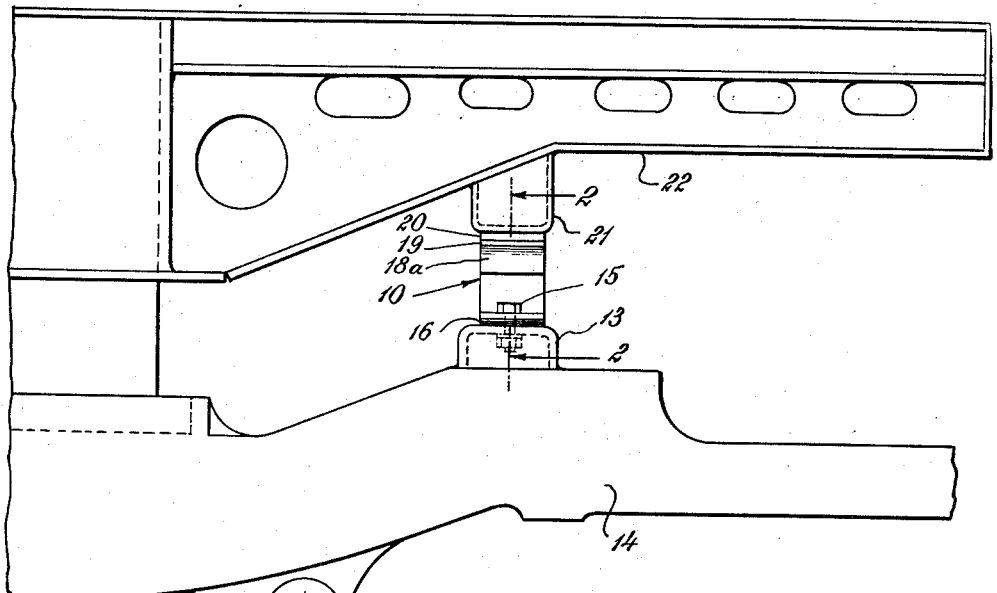
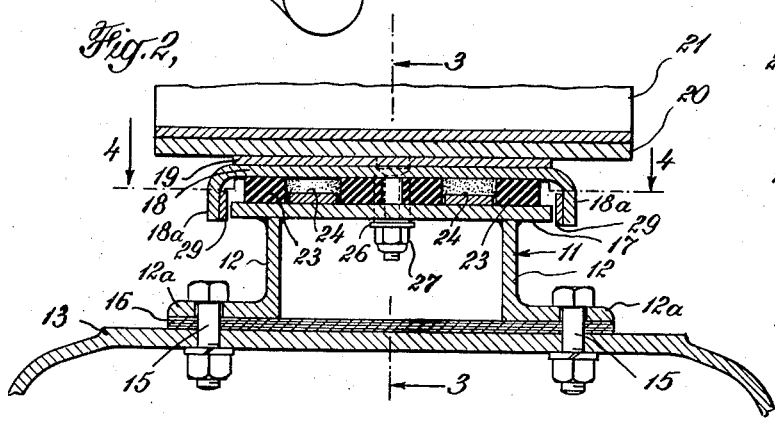
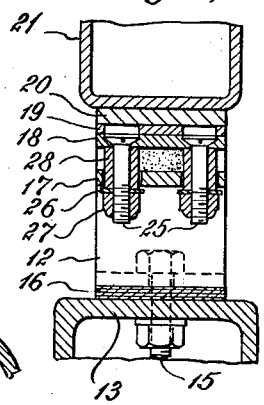
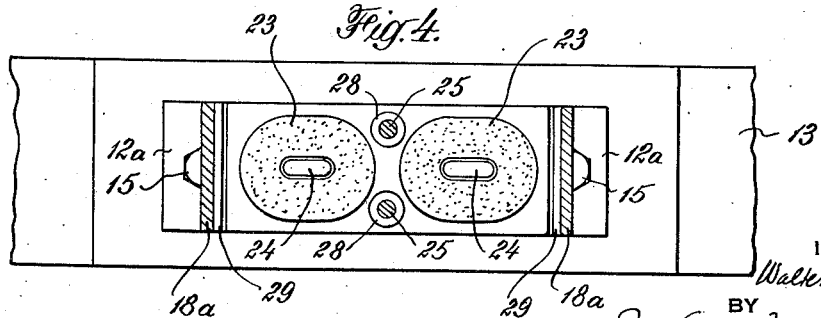
INVENTOR
Walker C. Dilg
BY
Pennie Edwards Morton Barrows Taylor
ATTORNEYS

United States Patent Office 2,698,208
Patented Dec. 28, 1954

2,698,208

SIDE BEARING

Walter Cabble Dilg, Hewlett, N. Y., assignor to Waugh Equipment Company, New York, N. Y., a corporation of Maine Application February 12, 1953, Serial No. 336,584

4 Claims. (Cl. 308—138)

This invention relates to side bearings for use on railway cars between the bolsters of trucks and the body bolsters above the trucks to limit and cushion the side sway of the car body. More particularly, the invention is concerned with a novel side bearing, which employs rubber as the cushioning means and is so constructed that it does not provide any all-metal path between the truck and car body, with the result that truck vibration cannot be transmitted through the side bearing to the car body but is isolated by the side bearing. Another valuable feature of the new side bearing is that it dampens angular vibration of the truck, with which it functions, about the center pin as an axis and thus prevents such vibration from building up to a dangerous amplitude. The new side bearing is mounted on a truck bolster and is normally in engagement with the overlying body bolster, so that the bearing acts at once to limit side sway tending to close the gap between the bolsters and is also immediately effective to resist the angular movement of the truck above mentioned.

For a better understanding of the invention, reference may be had to the accompanying drawing in which:

Fig. 1 is a view in elevation showing the new side bearing mounted between the bolster of a truck and a bolster of the body above the truck;

Fig. 2 is a sectional view on the line 2—2 of Fig. 1; and

Figs. 3 and 4 are sectional views on the lines 3—3 and 4—4, respectively, of Fig. 2.

In the drawing, the new side bearing generally designated 10 is illustrated as comprising a base 11, which includes a pair of angle irons 12. Each angle iron has a horizontal flange 12a lying parallel to a flat surface on a part 13 of the truck bolster 14 and the angle irons are secured to the bolster by bolts 15 passing through flanges 12a and the top wall of part 13 of the bolster. A group of shims 16 lies between part 13 and the flanges 12a, and the base may be raised or lowered slightly relative to the bolster by varying the number of shims used.

The upper ends of the vertical flanges of the angle irons 12 are connected by a top plate 17 welded to the flanges. The top plate is longer than the distance between the vertical flanges of the angle irons and projects beyond those flanges a considerable distance in a direction transverse to the bolsters. A cover 18 is mounted above the top plate and, on its upper surface, it carries a pad 19 of non-metallic friction material. The pad 19 is normally in contact with a wear plate 20 on a rigid bearing member 21 attached to the body bolster 22 lying above the truck bolster 14.

The upper surface of the top plate 17 is flat, as is also the opposed under surface of the cover 18. Between these surfaces are interposed resilient rubber means which support the cover in spaced relation to the top plate. In the construction illustrated, the resilient means take the form of a pair of rubber rings 23 of somewhat oval shape and encircling projections 24 secured to the upper surface of top plate 17 and serving to hold the rubber rings against lateral displacement.

The cover 18 is held against separation from the top plate 17 by means of a pair of bolts 25, which have heads lying in countersunk depressions in the cover. The bolts extend through the cover and top plate and each bolt is provided with a washer 26 and a lock-nut 27 on the end below the top plate. The bolts not only prevent any separation of the top plate and cover, but also provide means for maintaining an initial compression on the rubber rings 23. In order that the desired initial compression may not be exceeded during installation of the side bearing, each bolt is provided with a fiber sleeve 28, which lies between the head of the bolt and the washer thereon and prevents the nut on the bolt from being taken up too much. The sleeves on the bolts extend through openings through the top plate 17 and keep the bolts from contact with the top plate.

The bolts 25 with their sleeves 28 fit in the openings through the top plate 17 with some clearance, so that the cover 18 may move horizontally relative to the top plate. The major movement of the cover is in a direction transverse to the bolsters and, to limit this movement, the cover is provided with downwardly extending lugs 18a at its ends. These lugs lie opposite the ends of the top plate and each lug is provided with a liner pad 29 of non-metallic friction material.

It will be observed that, in the new side bearing, the movement of the cover 18 toward the top 17 of the base resulting from sway of the car body is resisted solely by the rubber elements 23 and there are no metal parts, which make contact because of such movement. Accordingly, each bearing affords a continuous cushioning action for side sway in one direction and sway in the opposite direction is continuously cushioned by the side bearing at the opposite side of the car.

During train movement, car trucks frequently begin to move back and forth angularly about their center pin as an axis, such movement aparently occurring because of wear in the truck or because of track irregularities. The angular vibrational movement referred to is known as "nosing" or "hunting" and, if not dampened, may acquire a dangerous amplitude as a result of harmonically applied forces. In the new side bearing, the friction pad 19 on the cover making continual contact with the wear plate on the rigid bearing member of the body bolster acts as a brake, which provides the desired dampening action.

In the form of the side bearing illustrated, the base is built up of the angle irons and the top plate and the cover 18 is provided with downwardly extending lugs 18a at its ends. It will be apparent that the base may be of unitary construction, such as a casting, and the cover may be formed, if desired, with lugs extending downwardly from all four edges of the cover and forming a skirt.

I claim:

1. In a side bearing for use on a railway car between the bolster of a truck and a body bolster above the truck, the body bolster being provided with a wear plate facing the truck bolster, the combination of a base having means at its lower end for attachment to the truck bolster and a top plate elevated above said attaching means and having a flat upper surface, a cover above the top plate having a flat under surface opposed to the upper surface of the top plate, at least one rubber cushioning element interposed between the cover and top plate and constituting the sole means for restricting the movement of the cover toward the top plate, a pad of non-metallic friction material secured to the upper surface of the cover and normally in contact with the wear plate on the body bolster, and means extending through the top plate and cover for holding the top plate and cover against separation and acting through them to maintain the rubber element under initial compression.

2. In a side bearing for use on a railway car between the bolster of a truck and a body bolster above the truck, the body bolster being provided with a wear plate facing the truck bolster, the combination of a base having means at its lower end for attachment to the truck bolster and a top plate elevated above said attaching means and having a flat upper surface, a cover above the top plate having a flat under surface opposed to the upper surface of the top plate, at least one rubber cushioning element interposed between the cover and top plate and constituting the sole means for restricting the movement of the cover toward the top plate, a pad of non-metallic friction material secured to the upper surface of the cover and normally in contact with the wear plate on the body bolster, at least one bolt extending through the top plate and cover and transversely disposed in respect thereto for holding them against separation, the bolt acting through the top plate and cover to maintain the rubber element under initial compression, and a sleeve disposed about the bolt with one end thereof abutting the cover and its opposite end extending through an opening in the top plate for limiting the action of the bolt in compressing the rubber element.

3. In a side bearing for use on a railway car between the bolster of a truck and a body bolster above the truck, the body bolster being provided with a wear plate facing the truck bolster, the combination of a base having means at its lower end for attachment to the truck bolster and a top plate elevated above said attaching means and having a flat upper surface, a cover above the top plate having a flat under surface opposed to the upper surface of the top plate, the cover having lugs extending downward therefrom to overlap the ends of the top plate, said lugs being normally spaced from the ends of the top plate, at least one rubber cushioning element interposed between the cover and top plate and constituting the sole means for restricting the movement of the cover toward the top plate, a pad of non-metallic friction material secured to the upper surface of the cover and normally in contact with the wear plate on the body bolsters, liners of non-metallic material on the inner faces of the lugs and facing the ends of the top plate, and means holding the top plate and cover against separation and acting through them to maintain the rubber element under initial compression.

4. In a side bearing for use on a railway car between the bolster of a truck and a body bolster above the truck, the body bolster being provided with a wear plate facing the truck bolster, the combination of a base having means at its lower end for attachment to the truck bolster and a top plate elevated above said attaching means and having a flat upper surface, a cover above the top plate having a flat under surface opposed to the upper surface of the top plate, at least one rubber cushioning element interposed between the cover and top plate and constituting the sole means for restricting the movement of the cover toward the top plate, means for supporting the rubber cushioning element against lateral movement, a pad of non-metallic friction material secured to the upper surface of the cover and normally in contact with the wear plate on the body bolster, means for limiting the movement of the cover relative to the top plate in a direction transverse to the bolsters, means extending generally at right angles to the planes of the plate and cover for holding the top plate and cover against separation and acting through them to maintain the rubber element under initial compression and means for limiting the action of the means for compressing the rubber element.

References Cited in the file of this patent

UNITED STATES PATENTS

| Number | Name | Date |
|---|---|---|
| 642,380 | Souther | Jan. 30, 1900 |
| 2,263,599 | Tucker | Nov. 25, 1941 |
| 2,301,372 | Cottrell | Nov. 10, 1942 |
| 2,514,034 | Dean | July 4, 1950 |